United States Patent [19]

Masuda et al.

[11] 4,132,337

[45] Jan. 2, 1979

[54] CONTINUOUS PAPER CYLINDER ASSEMBLY AND METHOD OF SEPARATING THE SAME AND TRANSPLANTING APPARATUS FOR THE SAME

[75] Inventors: Akiyoshi Masuda; Tetsuo Nambu, both of Obihiro, Japan

[73] Assignee: Nippon Tensai Seito Kabushiki Kaisha, Tokyo, Japan

[21] Appl. No.: 768,749

[22] Filed: Feb. 15, 1977

[30] Foreign Application Priority Data

Mar. 2, 1976 [JP] Japan .................................. 51-21766
Nov. 12, 1976 [JP] Japan ................................ 51-135183

[51] Int. Cl.² ........................ A01C 11/02; A01G 9/02; B26F 3/02
[52] U.S. Cl. .......................................... 225/5; 47/77; 47/86; 206/602; 206/820; 225/2; 111/2
[58] Field of Search ......................................... 47/86–87, 47/77, 63, 66, 74; 206/602, 820; 111/2–3; 225/1–5; 221/25

[56] References Cited

U.S. PATENT DOCUMENTS

| 1,190,196 | 7/1916 | Schweinert et al. | 206/602 |
| 2,022,548 | 11/1935 | Otwell | 47/86 |
| 3,113,673 | 12/1963 | Stein | 206/602 |
| 3,164,507 | 1/1965 | Masuda | 47/77 X |
| 3,515,036 | 6/1970 | Oki et al. | 47/77 X |

FOREIGN PATENT DOCUMENTS

84468  2/1958  Denmark ...................... 47/87

Primary Examiner—Robert E. Bagwill
Attorney, Agent, or Firm—Browdy and Neimark

[57] ABSTRACT

The present invention relates to a method wherein seedlings, raised in a paper cylinder assembly connected together by means of connecting portions having a separating line forming the separation course in each are continuously pulled out while separating the cylinder one by one and planting them in the field. In the separation of seedling cylinders, a transplanter is provided with rolls for pulling out continuous seedling cylinders and other rolls for separating the pulled out seedling cylinders into individual seedling cylinders. The latter has a faster rotating speed than that of the former and has a cone-like shape or is mounted so as to incline with respect to the former, thereby separating paper cylinders into individual pot bodies at the connecting portions, one by one, while moving the separation acting points progressively. The separating-line in each connecting portion has an unjoined separation-guiding-portion extending from one end to 20–70% of the height of the connecting portion. Joined and unjoined portions are distributed over the remainder of the height.

3 Claims, 21 Drawing Figures

CONTINUOUS PAPER CYLINDER ASSEMBLY AND METHOD OF SEPARATING THE SAME AND TRANSPLANTING APPARATUS FOR THE SAME

The present invention relates to a continuous paper cylinder assembly adapted to be continuously pulled out and separated into individual seedlings for planting, a method of separating this paper cylinder assembly, a seedling transplanting apparatus provided with a device for separating this paper cylinder assembly and a planting device.

The continuous paper cylinder assembly of the present invention is one in which individual paper cylinders are connected like a strip and thus made into a row of paper cylinders. The row of paper cylinders is folded at every preselected length, alternately right and left in a meandering way, so that it can be pulled out continuously in a row from one end toward the other end thereof. In the connecting portion of adjacent individual paper cylinders in said row, a separating line, a forming, separation course is set. A separation-guide portion is provided at the upper end portion, or the lower end portion or both upper and lower end portions of the separating-line, and thereby the connecting portion has a sufficient strength to resist against the pulling-out of its own seedling row of the paper cylinders after the nursing of seedlings but is easily separated by instantaneous mechanical pulling. It is very easily separated into individual paper cylinder seedlings by the use of a separating device wherein it is nipped by means of rotary bodies which are adapted to move the separation acting point successively, particularly from the separation-guide-portion. As from the upper to the lower or from the lower to the upper in the course of time along the separating-line. A further object of the present invention is that in the case of placing and planting individual paper cylinder seedlings continuously separated by means of a separating mechanism as described above from the row like paper cylinder seedlings through a delivery tube onto the field, the seedlings are buried in given positions, generally in a perpendicular situation, by means of a seedling delivery tube mounted with an inclination to the progressing direction with respect to the vertical position and a seedling control plate mounted corresponding to the exit of said seedling delivery tube. Another object of the present invention is to remove the overload on the connecting body of the paper cylinder assembly by controlling the distance between the pulling-out position of the grouped paper cylinder seedlings and a supply device so as to make it always constant thereby preventing the cutting-off of the continuous body in the course of pulling-out due to the pulling-out resistance. Furthermore the seedlings are prevented from falling sideways, resulting in attaining the continuous transplantation.

The present assignee has previously developed a paper cylinder assembly connected with each other as shown in U.S. Pat. No. 3,515,036. When the paper cylinder assembly pot bodies are placed on an automatic transplanting machine and each paper cylinder row is separated into individual seedlings, personal hands are used or a separating mechanism with a cutting blade is required, and accordingly, in the case of the latter, the connecting portions are cut mechanically under the pulled condition at all times. Thus if a break of the blade occurs, the cutting will be made difficult for a long time. As a result, there was a drawback in the seedling separating method by the use of personal hands or a cutting blade in that continuous planting operation of the continuous assembled paper cylinder seedlings became impossible, thus resulting in an inefficient operation.

The present inventors have completed a very practical invention hereinafter described in order to solve such problems of the prior art operation as a result of studying the construction and separating method of the paper cylinders and the transplanting machine for carrying out said method, and the relationship therebetween a unit.

The start of the study related to the construction of the connecting portions of the continuous paper cylinder assembly mutually connected thereby. The inventors had various experiments about how to rationally separate these connecting portions, and as a result found that in the case of a connected type paper cylinder assembly wherein the connecting portions were composed of connecting portions and said connecting portions had separation lines composed of needle holes of a sewing machine or slits formed at certain intervals in the vertical direction, they could resist against the parallel pulling separation in the horizontal direction to a great degree, but they could be separated by a small force in such a separation that only the upper end or lower end was pulled in one direction, namely, the separation acting point was moved from the upper end downward or from the lower end upward, as is obvious from Table 1.

Table 1

| Arrangement of connecting portion (uncut portion) (mm) (point) | Construction and Tensile Strength | | |
|---|---|---|---|
| | Horizontal tensile strength (A) (kg) | Tensile Strength in the course of time (B) (kg) | B/A × 100 (%) |
| 2 × 12 | 3.38 | 0.81 | 24 |
| 4 × 6 | 3.48 | 0.80 | 23 |
| 6 × 4 | 3.36 | 0.84 | 25 |
| 8 × 3 | 3.53 | 1.34 | 38 |
| 12 × 2 | 3.30 | 1.85 | 56 |
| 24 × 1 | 3.45 | 2.69 | 78 | wherein the paper cylinder subjected to the experiment is a paper cylinder (Nitten paper pot: trade name) having a longer diameter of 19mm of a hexagonal pot body in section, a height of 130mm of the pot body and a breadth of 9.5mm of the connecting body, and made of kraft paper subjected to rot-proof treatment.

In Table 1, the horizontal tensile strength (A) means a maximum load at the time of separation of the paper cylinder in such a way that in two pot bodies connected together seedlings are nursed under the usual seedling nursing condition and after the completion of the nursing, the seedlings and the soil are taken out therefrom and instead of them hexagonal poles made of aluminum having a shape corresponding to that of the paper cylinder space are inserted in said pot bodies, and one of the paper cylinders having the aluminum poles therein is fixed and the other is applied with a horizontal tensile load thereby causing the separation.

The tensile strength in the course of time (B) means a maximum load at the time of separation of the same paper cylinder in such a way that one of the paper cylinders as in (A) having the aluminum poles inserted therein, is fixed like in said (A), and the other is applied with a tensile load only at its upper end portion thereby causing separation (in this case the separation proceeds in V-shape). Namely, when the distance between the slits of the separation line of the connecting portion between the paper cylinders is changed appropriately and the joined portions (uncut portions) are distributed from one point to several points, respectively, the horizontal tensile strength (A) does not change, but the tensile strength in the course of time (B) decreases apparently and it is found that even if the tensile strength in the course of time (B) is about 25% of the horizontal tensile strength (A), the paper cylinders can be separated sufficiently, and there is little difference when the joined portion between the slits forming the separation line is below 6mm. On the contrary if it becomes over 6mm, there may be the case that the tensile strength becomes larger than the crushing strength of the paper cylinder, and as a result, the paper cylinders are damaged. Accordingly, 2–6mm is optimum for the joined portions. Furthermore, it has been found that if the uppermost portion of the slit of the separating-line contacts the upper edge of the connecting portion of the paper cylinder, the separation into each paper cylinder seedling becomes very good, so that the whole length of the joined portion (uncut portion) of the connecting portion between the paper cylinders is defined to 36mm and this is divided into six joined portions each having the length of 6mm thereby changing the distribution pattern in various ways. Thus, the tensile strength by the separation method, wherein the separation acting point moves in the course of time, and the tensile strength obtained by pulling horizontally was compared and studied, the results being shown in Table 2. As is obvious from the Table 2, the slit contacting with the upper edge of the connecting, portion acts as the separation guide portion apparently, and the length of this separating-guide-portion is preferably 20–70% of the height of the connecting portion even if in the ideal condition, and practically it is preferable to be 30–40%, and when the connecting portion has such a construction and the paper cylinders are connected together thereby, the mechanical separation becomes easy for the first time. Namely the inventors have found, from the results and knowledge of said Tables 1 and 2, the fact that in the case of the paper cylinder assembly connected by means of connecting portions so as to permit the continuous pulling-out thereof, if there are provided slits each having a preselected length from the upper edge of each paper cylinder connecting portion in the vertical direction inclusive of the upper edge thereby forming the separating-guide portions and in addition other slits are provided at preselected intervals from said guide portions linearly, thereby forming the separating-lines and thus the separation acting point is moved in the course of time from above downward, along the separating-lines, the continuous paper cylinder assembly seedlings can be continuously separated by a very small tensile force. The present invention has been obtained on the basis of such knowledge.

Table 2

Relation between dispersion condition of jointed portions between pot bodies of continuous assembly pot bodies and separation efficiency (total length of joined portions : 36mm)

| Defined dispersion condition of total sum joined portions:36mm | Length of holding part of upper end: cm |
|---|---|
| (Dispersion on the whole length of 13cm for No. 1 beet) | 0 |
| (Dispersion except upper end of 0.5cm) | 0.5 |
| Dispersion except 1cm | 1 |
| Dispersion except 2 | 2 |
| Dispersion except 3 | 3 |
| Dispersion except 4 | 4 |
| Dispersion except 5cm | 5 |
| Dispersion except 6 | 6 |
| Dispersion except 7 | 7 |
| Dispersion except 8 | 8 |
| Dispersion except 9 | 9 |

| Length of unjoined portion within dispersion: cm | *Number of piece of separation miss: % |
|---|---|
| 1.56 | 35 |
| 1.48 | 18 |
| 1.40 | 10 |
| 1.23 | 5 |
| 1.07 | 3 |
| 0.70 | 0 |
| 0.73 | 0 |
| 0.57 | 0 |
| 0.40 | 0 |
| 0.23 | 0 |
| 0.06 | 0 |

| Number of time of break of pulled out seedling row | Tensile strength in the course of time kg | Horizontal tensile strength kg |
|---|---|---|
| 0 | 1.3 | 2.5 |
| 0 | 1.1 | 2.4 |
| 0 | 1.0 | 2.5 |
| 0 | 0.8 | 2.4 |
| 0 | 0.7 | 2.4 |
| 0 | 0.5 | 2.5 |
| 0 | 0.4 | 2.3 |
| 0 | 0.4 | 2.1 |
| 5 | 0.5 | 2.0 |
| 15 | 0.6 | 1.9 |
| 40 | 0.5 | 2.0 |

*From ones getting out in rows unseparated to such ones wherein two pots are connected together, all are counted in number and converted into %.

Namely, the connecting portion of the continuous-type paper cylinder assembly used in the present invention is provided with a slit forming the separation-guide portion of a given length, formed by cutting in vertically from the upper edge of the connecting body and a separating-line having slits at given intervals linearly below said slit, and by means of joined portions (uncut portions) between slits the paper cylinders on both sides are connected together, and the total length of said joined portions is little longer than the total length of the slits. As the apparatus for separating this continuous type paper cylinder assembly individually, two rollers each having different diameters at the upper and lower portions thereof like cone shape are rotated at a speed larger than the delivery speed of the continuous paper cylinder rows, thereby nipping them, with the result that in the paper cylinder connecting body, the separation acting point is successively moved from above downward along the separating-line thereby dividing the connecting body. Thus the connecting body having the separation-guide portion can be very easily divided with little tensile force, so that the paper cylinder body is no longer damaged, and in addition, since the separation can be performed by means of a simple construction in which only rotors are rotated, mechanical continuous operation can be performed without any trouble. In the case the paper cylinder seedlings separated as described above are planted in the field, said connecting body separating mechanism is mounted on a transplanter comprising a seedling drop pipe and carrier having an opener for forming a planting furrow below said seedling delivery tube. Also, in order to guide the separated paper cylinder seedlings correctly to the field surface, a seedling limiter is mounted at the upper portion of said seedling delivery tube and a seedling control plate is provided behind said opener corresponding to the exit of the seedling delivery tube, said control plate being disposed at an angle larger than the attaching angle of the seedling delivery tube with respect to the horizontal direction, and thus the planting operation can be performed at a very high efficiency with correct planting position and plant spacing. As described above, the present invention has been completed by providing the connecting portion of the paper cylinders having the separation-guide-portion and the separation line and also by uniting the separating mechanism, wherein the separation acting point for separating such a connecting portion is moved in the course of time with, a transplanter having the seedling limiter and the seedling control plate mounted thereon as one body.

Hereinafter, the invention will be explained more in detail with reference to the accompanying drawings, wherein:

FIG. 7-a is a side view of a transplanter for carrying out the present invention;

FIG. 7-b is a plan view of FIG. 7-a;

FIG. 10-a is a side view of a seedling planting device;

FIG. 10-b is a cross-sectional view taken along the line C—C' of FIG. 10-a;

FIG. 10-c is a cross-sectional view taken along the line A—A' of FIG. 10-a;

FIG. 10-d is a cross-sectional view taken along the line B—B' of FIG. 10-a;

FIGS. 11-a through 11-e are perspective views showing various embodiments of the connecting systems of the connecting portion; and FIGS. 11-f and 11-g are plan views of FIG. and 11e, respectively.

In the drawings, P is a continuous paper cylinder assembly seedling body, 1 is an individual paper cylinder constituting a connected paper cylinder assembly, 2 is a film constituting the paper cylinder 1, which is made of a paper material such as kraft paper etc. usually having rot-proof properties of such a degree that during the period of the nursing of seedlings no decomposition occurs. Hexagonal or square hollow paper cylinders 1 are made from this film 2. 3 is a connecting portion adapted to connect individual paper cylinders 1 mutually, and said connecting portion is usually made of the same material as that used for the paper cylinders 1, but any material can be used therefor if it can produce the same effect as described above. In order to dispose the connecting portions between the adjacent paper cylinders 1, two sheets of film 2 forming the paper cylinders are pasted thereto at preselected intervals or as shown in U.S. Pat. No. 3,515,036 it may be attained in such a way that paper cylinders 1 are previously formed and then the films of a given breadth provided separately are pasted to said paper cylinders, said films being of the same material as that of the paper cylinder or different therefrom. Any other appropriate method can be adopted for said object. 4 is a slit which contacts with the upper edge 3' of the connecting portion 3 and is formed vertically inclusive of said upper edge, and this slit 4 constitutes the separation-guide-portion for facilitating the division of the connecting portion. 5 are other slits provided below the separation-guide-portion 4, linearly at preselected intervals. 6 are uncut portions, namely joined portions existing between the slits 5, and thus the separation line 6' is formed by the sequence of said slits 5 and joined portions 6. Accordingly, the greater part of the connecting portion 3 is cut in the vertical direction, so that the paper cylinders 1, 1 are connected together via the joined portions 6 being left. Accordingly, the characteristics of the connected paper cylinder assembly of the present invention lie in the total length of the joined portions 6 and how to dispose them in the dispersed relation. Namely, in order to pull out the connected paper cylinder assembly seedling bodies P after the seedling nursing in a row, the connecting bodies have a sufficient strength therefore, but they are required to be easily separated without any resistance in the subsequent dividing step. The connecting body 3 which satisfies such a condition is of the construction of the connecting body described previously with reference to the experimental examples, wherein the length of the separation-guide-portion 4 is within the range of 20 to 70% of the height H of the connecting portion 3 even if in ideal status, and more preferably within the range of 30 to 40% thereof. Also, below the separation guide portion 4 the slits 5 and the joined portions 6 are alternately arranged linearly. In this case, the total length of the joined portion 6 is formed in such a way that the lengths within a range of above 30 to 80% of the height H of the connecting body 3 are appropriately dispersed. The separation guide portion 4 may be provided at the upper edge portion or the lower edge portion of the connecting portion 3 correspondingly of the separation mechanism individually, or it may be provided at both of the upper and lower portions, and the separation line 6' may be suitably arranged in accordance with the arrangement of the separation-guide-portion 4. Numeral 7 is seedlings nursed in the paper cylinders, 8 is a paper cylinder separating device, and 9 and 10 are guide rolls which are fixed on shafts 9' and 10', respectively, and each covered by an elastic body 11 such as sponge on the periphery thereof. Both rolls 9, 10 confront each other with an interval which allows the rolls to nip the paper cylinder 1. The shafts 9', 10' are connected to a power source thereby obtaining the driving force. 13 and 14 are follower rolls which are covered by an elastic body 11 on their peripheries like the guide rolls. 15 and 16 are belts, wherein the belt 15 is stretched between the rolls 9, 13 and the belt 16 is between the rolls 10, 14. These belts 15 and 16 run in the direction of the arrow respectively, and between the belts 15, 16 a paper cylinder row supply path 17 is formed. 18 and 19 are separating rolls which are fixed on shafts 18' and 19', respectively, and are covered by an elastic body 11 such as sponge on their peripheries and are of a cone shape having the upper end of a larger diameter and the lower end of a smaller diameter. The separating rolls are constructed such that the larger diameter portion thereof has a peripheral speed faster than the linear speed of the belts 15, 16, and mounted opposite to each other at the exit of the paper cylinder row supply path 17.

Figure 1:
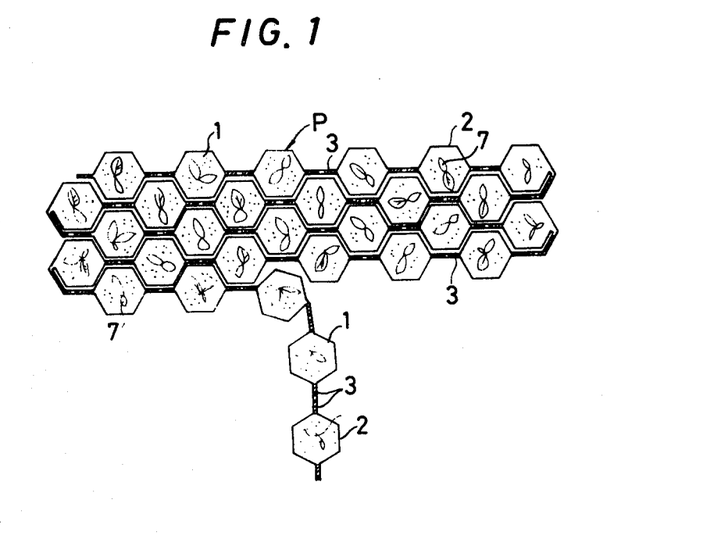
FIG. 1 is a plan view showing the situation in which the continuous paper cylinder assembly seedlings, after the completion of nursing of the seedlings, are pulled out from one end thereof.
Figure 2:
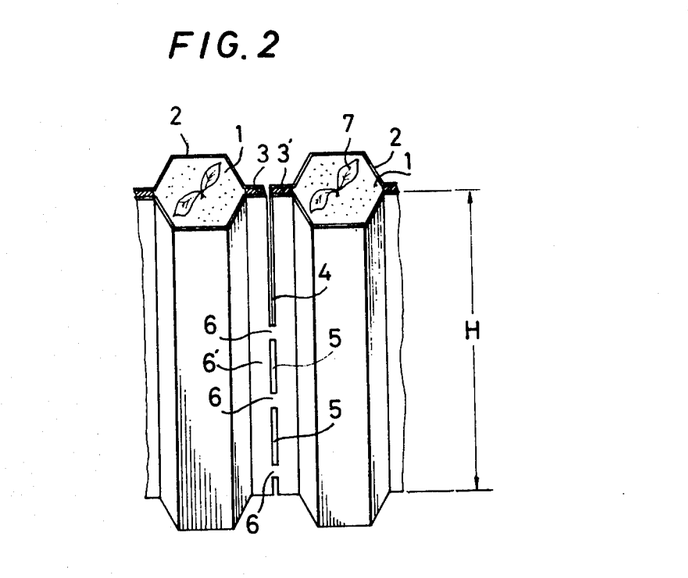
FIG. 2 is a perspective view partly in detail, showing the continuous paper cylinder assembly of FIG. 1.
Figure 3:
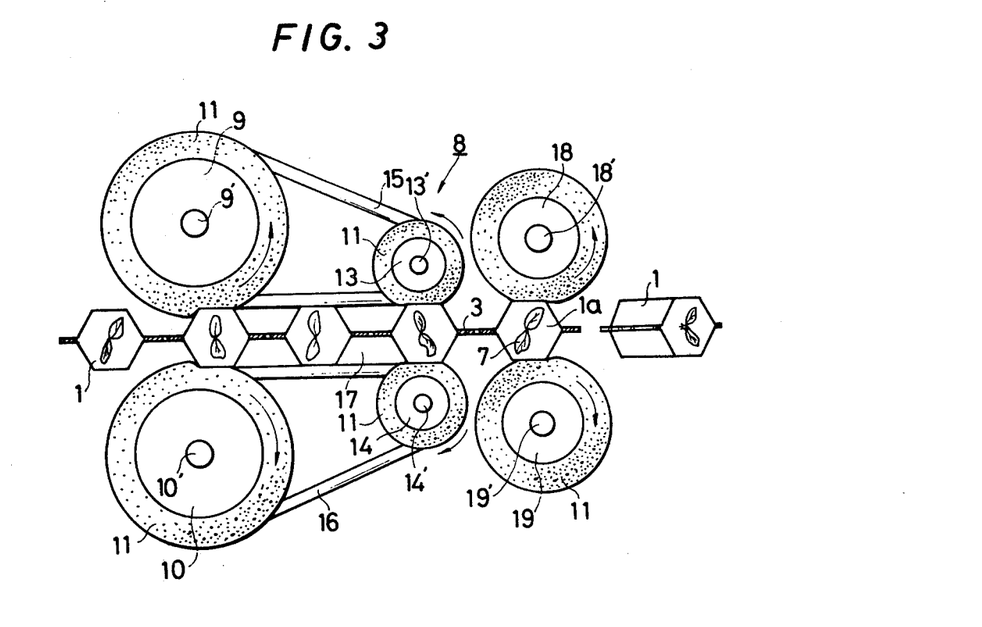
FIG. 3 is a plan view of the main part of the separating mechanism for dividing the connecting portion of the continuous paper cylinder assembly of FIG. 1.
Figure 4:
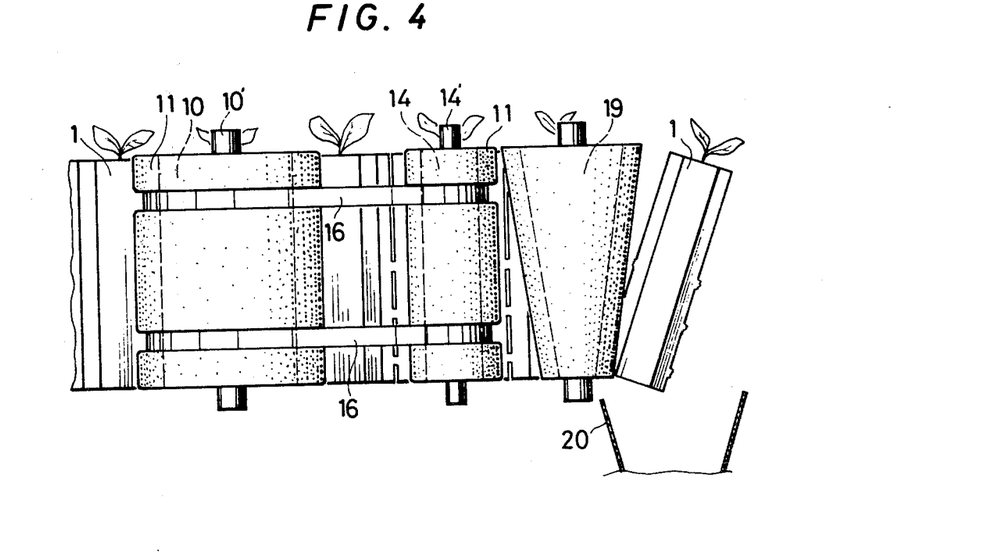
FIG. 4 is a side view of FIG. 3.

The paper cylinder separating device 8 is constructed as described above, wherein the row of the paper cylinders 1 progresses on the paper cylinder supply path 17 progressively by the belts 15, 16 rotating at a constant speed and at the exit thereof the leading paper cylinder 1a is nipped by the separation rolls 18 and 19, and in this case the separating rolls are constructed such that the rotary speed thereof is larger than that of the belts 15, 16 of the paper cylinder supply path 17 and the diameter of the upper portions of said separating rolls are larger than that of the lower portions thereof, so that the upper portions have a faster peripheral speed than the lower portions, and accordingly the connecting portions 3 of the paper cylinders 1a are progressively separated in the course of time by means of the separating rolls 18, 19, and the separated paper cylinders 1a are progressively planted by means of an appropriate planting mechanism, and if the drop pipe 20 is mounted below the separating rolls 18, 19, the paper cylinders 1a can be planted in the field by the natural drop action, so that the connection type paper cylinder seedlings can be automatically separated into individual paper cylinder seedlings 1 by repeating said operations successively.

Figure 5:
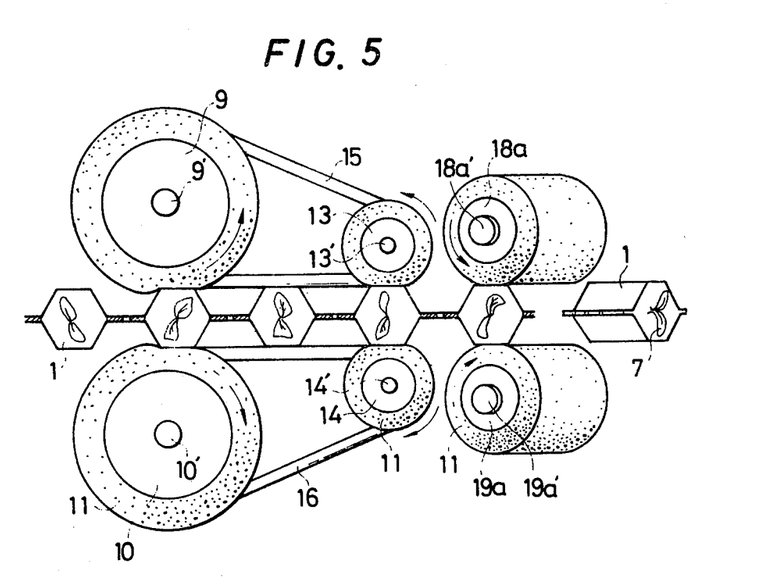
FIG. 5 is a plan view showing another embodiment of the separating device of FIG. 3.
Figure 6:
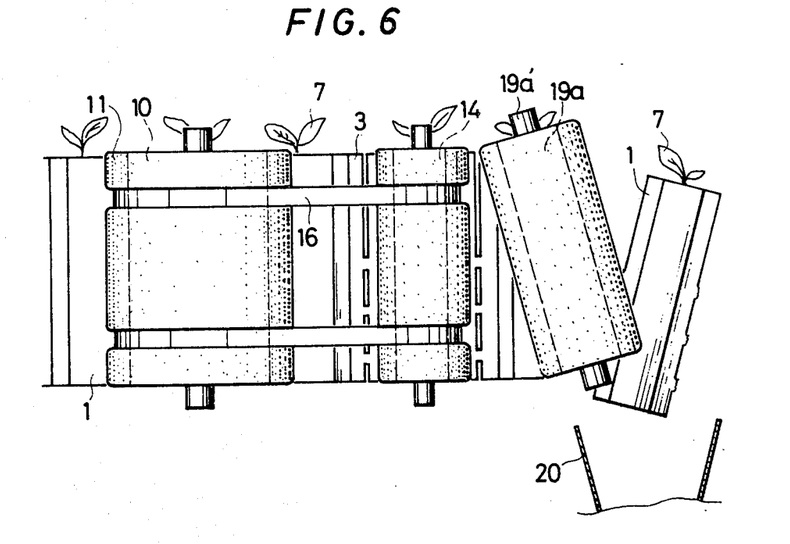
FIG. 6 is a side view of FIG. 5.

FIGS. 5 and 6 show another embodiment wherein the separating rolls are a pair of cylindrical rolls 18a, 19a each having the same diameter from the upper end to the lower end thereof, and these rolls are mounted so as to incline at a certain angle to the parallel pulling-out direction of the paper cylinder seedling row thereby producing a substantial difference between the tensile forces of the upper and lower ends of the paper cylinder row contacting with the rolls 18a, 19a, resulting in also arising the same effect as that in the case of said cone rolls 18, 19. As described above, in the present invention any device can be used if it can produce a substantial difference of the pulling-out force between the upper and lower ends with respect to the connecting body 3.

Figure 7A:
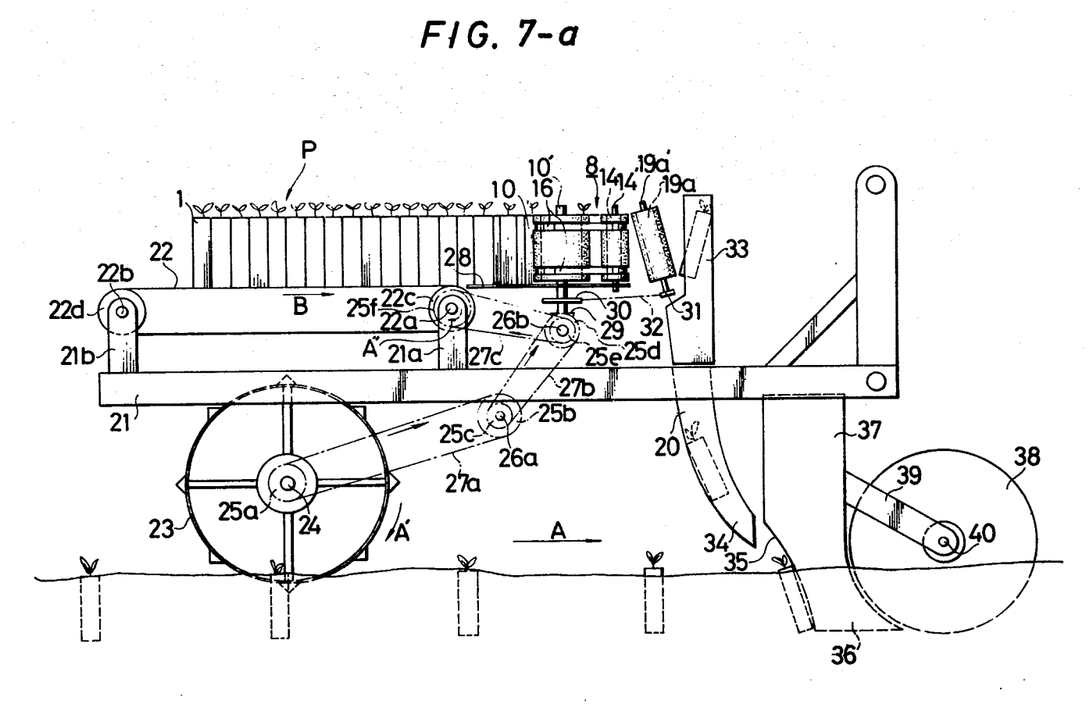
Figure 7B:
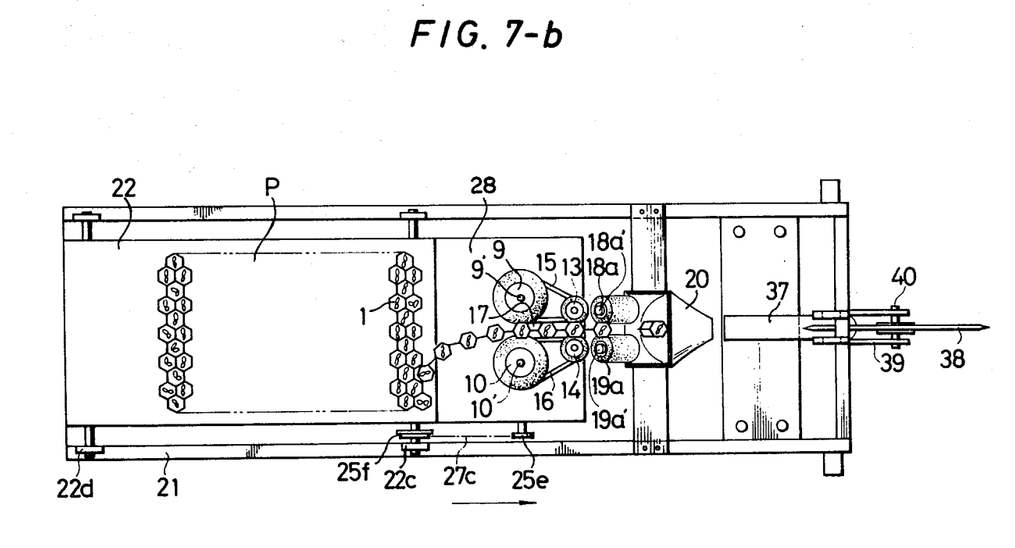
Figure 8:
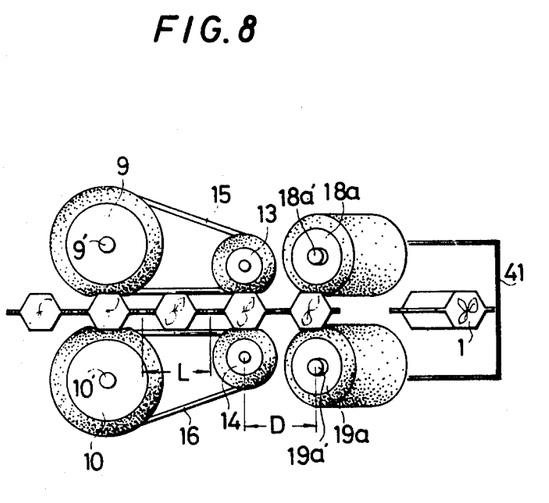
FIG. 8 is a detailed plan view showing the separating portion of FIGS. 7-a and 7-b.
Figure 9:
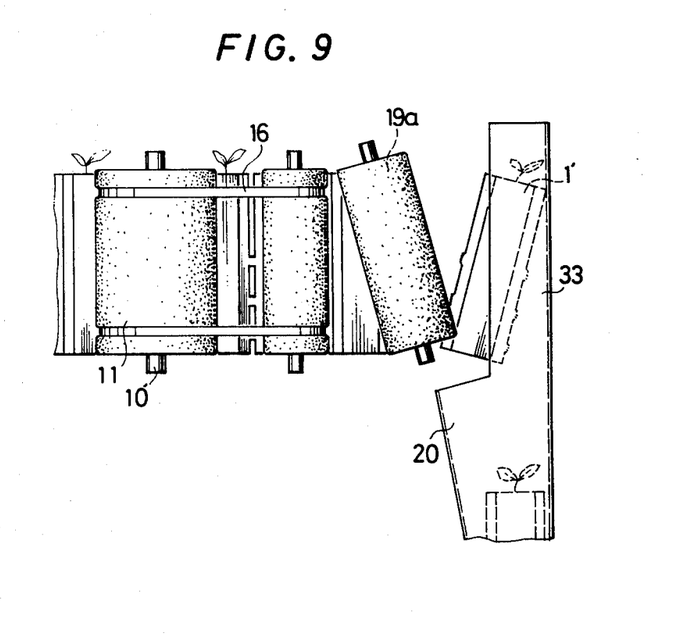
FIG. 9 is a side view of FIG. 8.
Figures 10A, 10B, 10C, 10D:
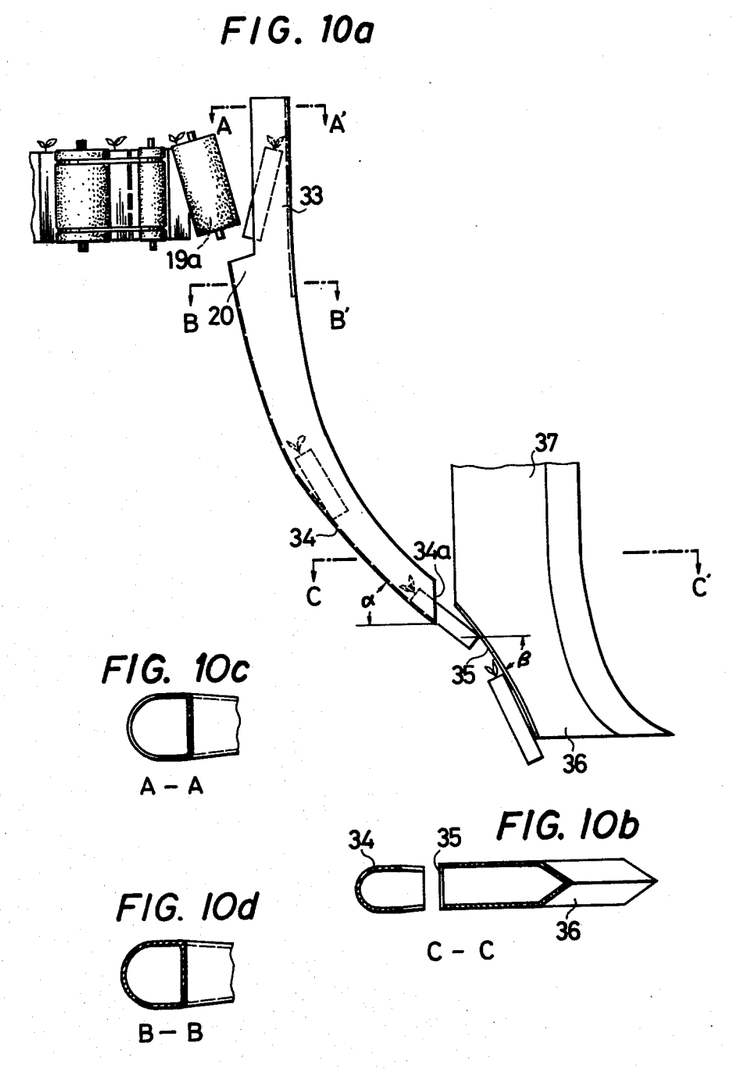
Figure 11A:
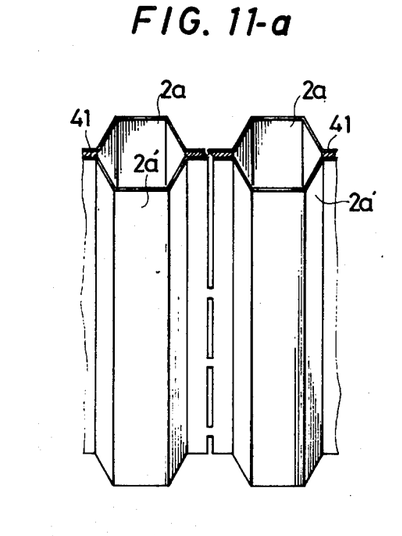
Figure 11B:
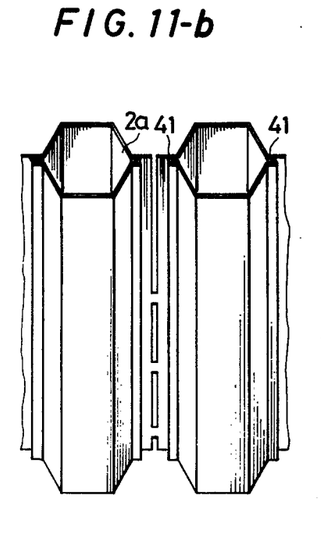
Figure 11C:
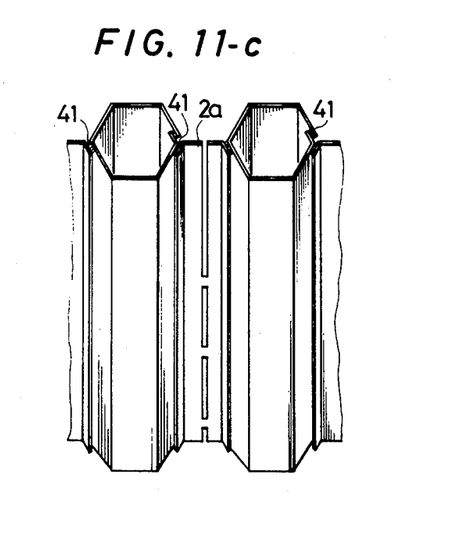
Figure 11D:
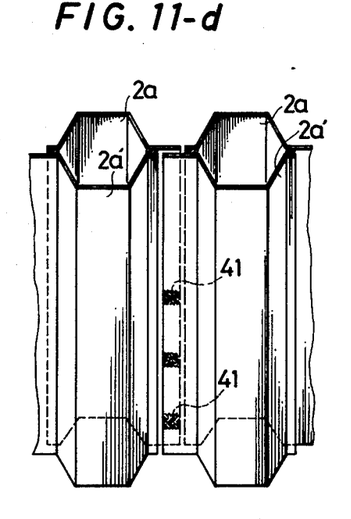
Figure 11E:
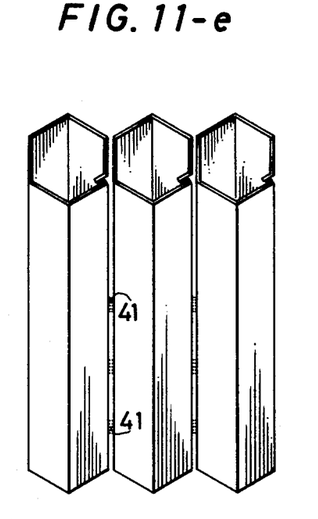
Figure 11F:
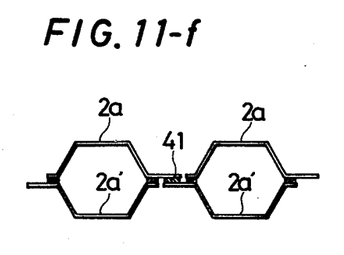
Figure 11G:
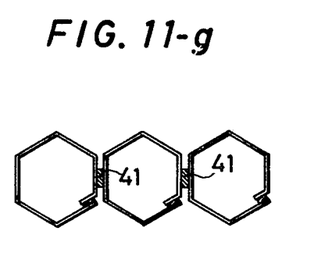

FIGS. 7a and 7b show a transplanting machine for carrying out the method of the present invention, wherein 21 is a machine frame, 22 is a belt conveyor for putting the connected paper cylinder assembly P thereon, which conveyor is stretched between a drive pulley 22c and a driven pulley 22d, which are fixed on shafts 22a and 22b respectively, said shafts being supported on support rods 21a and 21b mounted on the machine frame 21 respectively. 23 are wheels which are mounted on a shaft 24 rotatably mounted on the machine frame 21. 25a, 25b, . . . 25f are chain sprockets, and the chain sprocket 25a is mounted on the shaft 24, the chain sprockets 25b, 25c on a shaft 26a, the chain sprockets 25d, 25e on a shaft 26b, and the chain sprocket 25f on the drive pulley shaft 22a respectively. 27a, 27b and 27c are chains, and the chain 27a is stretched between the chain sprockets 25a and 25b, the chain 27b between the chain sprockets 25c and 25d and the chain 27c between the chain sprockets 25e and 25f, respectively.

Using such chain sprocket and chain mechanism, in the case of the transplanting machine travelling in the direction of the arrow A, the wheels 23 rotate in the direction of the arrow A', and this rotation rotates the chain sprocket 25f in the direction of the arrow A" through the chain sprockets 25a, 25b, . . . 25e and the chains 27a, 27b and 27c, and thereby the belt conveyor pulley 22c rotates, resulting in rotation of the belt conveyor 22, so that the paper cylinder assembly P on the belt conveyor 22 progresses in the direction of the arrow B. 8 is a paper cylinder supply device, in which a fixed plate 28 is fixed on the machine frame 21 at the forward end of the belt conveyor 22, and rotary rolls 9, 10 and 13, 14 are fixed on shafts 9', 10' and 13', 14' respectively and rotatably journalled on the fixed plate 28, said rolls being covered by an elastic body 11 such as sponge on the peripheries thereof and mounted opposite to each other with an interval therebetween which permits nipping one piece of the paper cylinders 1 therebetween. Also, the rolls 9, 13 and 10, 14 have a suitable interval therebetween respectively. The belts 15, 16 are stretched between the rotary rolls 9, 13 and between the rotary rolls 10, 14, respectively, and rotated in the direction of the arrow and the paper cylinder supply path 17 is formed between the belts 15, 16. The separating rolls 18a, 19a covered by the elastic body 11 on their peripheries are oppositely mounted at an interval from the exit of the paper cylinder supply path 17 and mounted on the machine frame 21 so as to incline to the rotary rolls 13, 14 at an angle so that the paper cylinder 1 contacting with said separating rolls 18a, 19a is applied with a pulling-out force on its upper and lower ends at different times. In the case of locating the separating rolls 18a, 19a opposite to the rolls 13, 14, in order to ensure the separation it is preferable that the center distance (D) therebetween is below two times of a unit length (L) which is the breadth of the paper cylinder 1 plus respective halves of the breadth of the forward and rearward connecting portions of this paper cylinder.

29 is a bevel gear which is fixed on the lower end of the shaft 10' of the rotary roll 10 and engaged with a bevel gear (not shown) mounted on the shaft 26b correspondingly, and also a bevel gear (not shown) is also mounted on the lower end of the shaft 9' of the rotary roll 9 and engaged with a bevel gear (not shown) mounted on the shaft 26b corresponding thereto. The bevel gear (not shown) of the shaft 26b driving the bevel gears, 29 of the shafts 10' and 9' is arranged so as to rotate the shafts 10', 9' in the opposite directions, and the rolls 10, 9 are rotated in the direction of the arrow through the rotation of the shaft 26b. Also, owing to the rotation of the shaft 26b the belts 15, 16 rotate through the rotary rolls 9, 10. Between the gear 30 mounted on the shaft 10' and the gear 31 mounted on the shaft 19a' of the separating roll 19a and between the gear 30 mounted on the shaft 9' and the gear 31 mounted on the shaft 18a' of the separating roll 18a chains 32, 32 are respectively stretched, thereby rotating the separation rolls 18a, 19a in the arrow direction. As a result of the above construction, the rotary rolls 9, 10 rotate by the rotation of the wheel 23, and thereby the belts 15, 16 rotate, so that the paper cylinder assembly P progresses on the paper cylinder supply path 17 in a row successively. When the leading paper cylinder 1a reaches the exit of the paper cylinder path 17 and contacts to the separation rolls 18a, 19a, as described above, since the rotary rolls 13, 14 and the separating-rolls 18a, 19a are located at an interval of $D \leq 2L$, the leading paper cylinder 1a is nipped and forwarded between the separating-rolls 18a, 19a under the situation wherein the second paper cylinder 1b is firmly nipped between the rotary rolls 13, 14. In this case, since the peripheral speed of the lower portions of the separating-rolls 18a, 19a is larger than the supply speed of the seedling row as described above, the leading paper cylinder 1a is applied with a force tending to pull apart it from the second paper cylinder 1b, and also since the separating-rolls 18a, 19a are inclined toward the backward direction of the transplanting machine, time points to apply the pulling action change in the course of time with displacing from the lower portions of the rolls to the upper portions thereof, the force acting between the paper cylinder 1a and the paper cylinder 1b becomes larger at the upper portion and smaller at the lower portion at a point of time, so that the connecting portion 3 moves its separation acting point downward in the course of time progressively via the separation guide portion 4 provided adjacent to the upper edge of the connecting body thereby causing V-shaped separation of the connecting body surely. The speed ratio of the linear speed of the belts 15, 16 resulting from the rotary rolls 9, 10 and 13, 14, respectively to the separating rolls 18a, 19a can be easily determined by the ratio of rotation of the chain sprockets 30, 30 to the chain sprockets 31, 31 mounted on their respective shafts 9', 10' and 18a', 19a'. Upon pulling-out of this paper cylinder assembly seedlings in a row, the front line of the pulling-out of the seedlings retires as the separation of the paper cylinders proceeds successively so that the distance from the paper cylinder separating device 8 becomes larger, with the result that the resistance of the pulling-out of paper cylinders may become large and the paper cylinder row on the conveyor 22 may fall down or may cut off on the way. Accordingly, in order to hold the distance between the foremost line of the paper cylinder assembly P on the belt conveyor 22 and the paper cylinder separation device 8 constant thereby removing said drawback, the ratio of rotation of the bevel gears, 29 for rotating the rotary rolls 9, 10 to the chain sprocket 25f fixed on the shaft 22a for rotating the pulley 22c of the belt conveyor 22 is set to a preselected value so that the distance between the front line of the pulling-out of paper cylinder and the separation device 8 is made constant. Namely, since the linear speed ratio of the belts 15, 16 of the paper cylinder supply path 17 to the belt conveyor 22 is determined by the ratio of the whole length of the paper cylinder row pulled out per one row to the progressing distance of the paper cylinder per one row, the rotary ratio of said bevel gear 29 to the chain sprocket 25f can be determined corresponding to this ratio. The seedling delivery tube 20 is fixed to the machine frame 21 directly below the separating rolls 18a, 19a and has a receiving mouth of circular or angular shape in section, and a seedling limiter 33 having a height substantially the same as that of the separating rolls 18a, 19a is connected to the outer edge portion of the upper receiving mouth of the delivery tube 20 so that the paper cylinder 1 separated by the separating rolls 18a, 19a is positively guided into the receiving mouth of the seedling delivery tube 20 as it is in standing position and dropped as it is. 34 is a first seedling control body for guidance connected to the lower portion of the seedling delivery tube 20. Said control body 34 is composed of a tube body or a body having a flat plane or curved surface with an upward sliding surface and is mounted at a preselected angle α in the progressing direction of the transplanting machine. Thus the paper cylinder seedlings naturally dropped through the seedling delivery tube 20 slidingly drop down with the side face of the paper cylinder slidingly contacted with the upper surface of the control body 34. 35 is a second seedling control plate which is mounted opposite to the exit 34a of the first seedling control body 34 and mounted at the back portion of an opener 36 attached to the forward end of the support rod 37 fixed to the machine frame 21 in front of the seedling delivery tube 20 with an inclination. The upper end of the second seedling control plate 35 is opposite to the first seedling control body 34 and the lower end thereof has a length corresponding to the depth of the furrow of the opener 36. It is adapted to receive the paper cylinder seedlings slidingly dropped from the exit 34a of the first seedling control body and is composed of a plate body having a flat plane directed downward as its slidingly contacting face or a curved body having such contacting surface. The inclination angle β of the second seedling control plate 35 is larger than the inclination angle α, and thereby the paper cylinder seedlings dropped from the exit 34a of the first seedling control plate are suitably guided to the field and always placed thereon at a constant angle thereto. The second seedling control plate 35 may be attached directly to the back face of the opener 36 or alternatively, may be mounted behind the opener 36 at an appropriate interval therefrom. In the case above described, the first seedling control body 34 and the second seedling control plate 35 are mounted quite separately, individually, but these first and second seedling control bodies may be composed of one tube body formed by connecting them together and each having an exit corresponding portion as a given position. The second seedling control plate may be a slit body if the paper cylinder 1 can slide thereon, and the paper cylinder 1 is always controlled by said second seedling control plate 35 for having a constant position and thus placed on the field and at the same time soil formed with a furrow by means of the opener 36 is again returned and said paper cylinder is buried by said returned soil almost vertically thereby completing the transplanting of the paper cylinder. 38 is a disc colter which is rotatably supported by a shaft 40 on a bracket 39 fixed to the support rod 37 and mounted near the front of the opener 36 and adapted to prevent the intertwining of trash such as thin roots of plants included in the soil of the field which gives obstruction at the time of producing a cut furrow by means of the opener 36. As the paper cylinder assembly which can be used in the present invention, there may be used ones such as assembly (11-a) wherein two films 2a, 2a' are pasted together by means of a water-proof paste 41 as a method of connecting between the paper cylinders 1, 1 as shown in FIG. 11, an assembly (11-d,f) wherein the connection is made by one film 2a, an assembly (11-d) wherein the overlapped portion of two films 2a, 2a' is partly pasted by means of a water-proof paste 41 and an assembly (11-eg) wherein the paper cylinders are directly pasted together by means of a water-proof paste 41 without using the film 2a or 2a' etc. These connecting methods of the paper cylinders have been publicly known, and even if such constructions using said publicly known methods are adopted, it is possible to attain approximately the same effects as those described above. Also, in the connecting methods 11-d, e by means of paste, the distribution of the joined portions may be such that the joined portions are distributed slenderly continuously over the length of a defined range in the direction of the height of the pot body 1 thereby attaining approximately the same object.

As described above, the present invention has completed a full automatic separation and transplanting of plant seedlings by means of a continuous paper cylinder assembly in a very economical system, which could not be realized heretofore, and as a result the productivity of agricultural labor can be greatly elevated.

Hereinafter, embodiments of the present invention will be explained.

EXAMPLE 1

Kraft paper of 60g/m² was applied with hydrated solution of copper 8-hydroxyquinolinolate having 1% of the component on the surface and dried to make rot-proof paper, and two sheets of this paper were pasted together to make paper cylinders for beet of hexagonal cross-section having a longer diameter of 1.9cm and a height of 13cm when developed. These paper cylinders were connected by pasting breadth of 0.95mm and had a separation guide portion (slit) of 4cm extending from the upper end in the height direction of the paper cylinder in the center of the connecting portion, and had joined portions of 6mm on the lower portion of 9cm at the rate of one in every 3cm and the remaining portion as the separation line. Ten of these paper cylinders were arranged into a lateral row and connected together, and then next ten paper cylinders were overlapped thereto with an offset of a half pitch of the paper cylinder and pasted together by means of a water soluble paste and, like this, 140 rows of the paper cylinders were laminated thereby making a unit of the paper cylinder assembly including 1400 paper cylinders, and thus a number of the units were produced.

In such paper cylinders, sugar beet were raised in a cold bed, and these paper cylinder assembly seedlings were put on the belt conveyor 22 of the transplanting machine as shown in FIG. 7, the wheels 23, the shafts 9', 10' of the rotary rollers 9, 10 and the shafts 18a', 19a' of the separating rolls 18a, 19a were drivingly connected by means of the chain 32, and furrows were produced by means of the opener, and said 1400 paper cylinders were pulled out from one end thereof by means of the rotary rolls, and a pair of separation mechanisms were arranged in front of said rotary rolls said rotary rolls having the peripheral speed of 9cm/sec., said separation mechanism having the separating rolls having the linear speed ratio of the upper end to the lower end of 2:1, the lower end having a peripheral speed of about 9cm/sec. These separating rolls were covered by sponge on the surface thereof. A unit of 1400 of the separated seedlings were transplanted at a speed of 0.9m/sec. by means of a device for planting them into the field through the seedling delivery tube 20 and the first seedling control body 34 under control by the second seedling control plate 35 as they were. As a result, the separation of the seedlings was attained very smoothly, and perfect automatic mechanical separation was performed without cutting-off of the connecting portions on the way thereof, and there was no mechanical damage of the seedlings and almost all of the paper cylinder seedlings were planted in the field in the vertical position.

EXAMPLE 2

Using the same paper material as that in Example 1, a large number of units of the paper cylinder assembly were made, each unit including a total of 700 paper cylinders, having 7 paper cylinders × 100 rows, wherein each developed paper cylinder for cone had a regular hexagonal shape in section having a longer diameter of 3cm and a length of 10cm, and these were assembled into an assembled paper cylinder body. The connecting portion between the pots was such that except for 3.5cm from the upper end, the joined portion of 6mm was distributed by dividing it into the equal parts over the lower portion of 6.5cm.

After nursing sweet cone in these paper cylinders, the paper cylinder assembly was put on the carrier in a lump without breaking it, and the seedling rows were pulled out by means of the transplanting machine which was similar to that in Example 1, but as the separating mechanism in front of the guide rotors a pair of rotary cylindrical bodies, instead of the cone shape in Example 1, were parallel disposed with an interval of 1.6cm at the lower portions thereof and inclined at about 15° to the progressing direction of the seedling rows, said cylindrical bodies each having a diameter of 4cm and a height of 12cm and urethane sponge applied on the surface thereof. 700 of the paper cylinders were transplanted at the speed of 0.9m/sec., fully automatically, with the result that the separation was perfect and the transplanting was perfect in the rate of 100%.

What is claimed is:

1. A method of separating seedling bodies, individually and successively, from a continuous assembly of generally cylindrical seedling bodies, each of said bodies being filled with soil and containing a seedling previously planted therein, said seedling bodies having no caps or bottoms and being made of rot-proof paper or film, said assembly of seedling bodies including a plurality of seedling bodies, each pair of adjacent seedling bodies being connected together by means of a connecting portion to form a strip of seedling bodies, said strip of seedling bodies being assembled into a row-state by folding right and left, alternately at every preselected length thereof, wherein each of said connecting portions have a separating-line therein at which it is desired to separate individual seedling bodies prior to transplanting, said separating-lines having a separation-guide-portion provided at the upper or lower end or both ends of each separating-line, comprising:
   pulling out the assembly of seedling bodies from one end thereof;
   separating individual seedling bodies by applying tensile stress to the connecting portions between the previous seedling body and the succeeding seedling body initially only at the end of said separating-line in which is said separation-guide-portion and progressively moving the area of applied stress linearly along said separating-line, thereby separating the assembly into individual seedling bodies.

2. A method in accordance with claim 1 wherein said pulling out and separating steps are accomplished by feeding the assembly of seedling bodies from one end thereof into at least a pair of driven rotors which guide and feed the strip to a separating means comprising a pair of driven rotary cone-shaped rollers, or rotary cylinder rollers mounted with an inclination, wherein the separating means have a speed greater than that of said rotors.

3. A continuous paper pot assembly comprising a plurality of generally cylindrical pot bodies without caps or bottoms made of paper having rot-proof properties, each pair of adjacent pot bodies being connected together by means of a connecting portion to form a strip of pot bodies, said strip of pot bodies being assembled into a row-state by folding right and left, alternately, at every preselected length thereof, wherein each of said connecting portions has a separating-line therein at which it is desired to separate individual pot bodies prior to transplanting, said separating-lines having a separation-guide-portion provided at the upper or lower end or both ends of each said separating-line, said separation-guide-portion comprising a continuous unjoined portion of 20–70% of the height of said connecting portion and wherein the remainder of said separating-line has a plurality of joined portions distributed thereon between unjoined portions.

* * * * *